United States Patent
Katta

(10) Patent No.: US 11,956,219 B2
(45) Date of Patent: Apr. 9, 2024

(54) SYSTEMS AND METHODS TO DETECT AND PREVENT BOTS FROM RANDOM ACCESS BY RANDOMIZED HTTP URLS IN REAL TIME IN DISTRIBUTED SYSTEMS

(71) Applicant: Citrix Systems, Inc., Fort Lauderdale, FL (US)

(72) Inventor: Rama Rao Katta, Fremont, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 72 days.

(21) Appl. No.: 17/357,623

(22) Filed: Jun. 24, 2021

(65) Prior Publication Data
US 2022/0417222 A1 Dec. 29, 2022

(51) Int. Cl.
*H04L 9/40* (2022.01)
*H04L 67/02* (2022.01)
*H04L 67/14* (2022.01)

(52) U.S. Cl.
CPC ........ *H04L 63/0414* (2013.01); *H04L 63/102* (2013.01); *H04L 63/1416* (2013.01); *H04L 63/1425* (2013.01); *H04L 67/02* (2013.01); *H04L 67/14* (2013.01)

(58) Field of Classification Search
CPC .............................. H04L 67/02; H04L 67/14
See application file for complete search history.

(56) References Cited

U.S. PATENT DOCUMENTS

| | | | | |
|---|---|---|---|---|
| 6,330,566 B1 * | 12/2001 | Durham | ................ | G06F 16/972 |
| 2005/0192863 A1 * | 9/2005 | Mohan | .................. | G06Q 30/02 705/14.27 |
| 2006/0277596 A1 * | 12/2006 | Calvert | ............... | H04L 63/0218 726/3 |
| 2008/0307044 A1 * | 12/2008 | Musson | .................. | H03M 7/30 709/203 |
| 2009/0193129 A1 * | 7/2009 | Agarwal | ............... | H04L 67/568 709/229 |
| 2009/0193513 A1 * | 7/2009 | Agarwal | ............... | H04L 63/105 726/15 |
| 2012/0036178 A1 * | 2/2012 | Gavini | .................... | H04L 67/02 709/203 |
| 2012/0124372 A1 * | 5/2012 | Dilley | .................. | H04L 67/564 713/162 |

* cited by examiner

*Primary Examiner* — Andrew C Georgandellis

(57) ABSTRACT

Described embodiments provide systems and methods for preventing unauthorized access of information from a resource. A device intermediary between a client and a server in a session can receive a first request from the client that includes a first uniform resource locator (URL) of the server. The device may receive a response from the server that includes a second URL. The device may update the response by including a client identifier for the session in a set-cookie field, obfuscating the second URL into a string, and replacing the second URL in the response with the string. The device may receive a second request that includes a candidate client identifier, and a third URL. The device may determine whether the second request is valid, by at least one of: matching the candidate client identifier with the client identifier, and determining whether the second URL is recoverable using the third URL.

6 Claims, 8 Drawing Sheets

SYSTEMS AND METHODS TO DETECT AND PREVENT BOTS FROM RANDOM ACCESS BY RANDOMIZED HTTP URLS IN REAL TIME IN DISTRIBUTED SYSTEMS

FIELD OF THE DISCLOSURE

The present application generally relates to protecting resources from unauthorized access, including but not limited to systems and methods for preventing malicious entities or bots from randomly accessing information from one or more resources and/or services.

BACKGROUND

Certain protocols can execute one or more processes that are vulnerable to unauthorized or malicious attempts to access one or more resources. Some approaches may provide protective mechanisms against said attempts. For example, one or more approaches may configure one or more points of entry/access to a resource. An authorized user may use the one or more points of entry to access a resource and/or navigate/traverse to other resources. At least one problem with said approaches may be a failure to provide adequate protection against unauthorized attempts by an attacker to randomly access/traverse the one or more resources. Failing to provide adequate protection can provide the attacker with opportunities to access sensitive/secured information.

SUMMARY

This Summary is provided to introduce a selection of concepts in a simplified form that are further described below in the Detailed Description. This Summary is not intended to identify key features or essential features, nor is it intended to limit the scope of the claims included herewith.

The present disclosure is directed towards systems and methods for preventing malicious entities from gaining unauthorized access to information from a resource (e.g., via a uniform resource locator (URL)) and/or a service (e.g., an application resource, such as a web application, SaaS application or remote-hosted network application). If a request to access a resource (e.g., via URLs in requests) is validated according to the systems and methods described herein, a device (e.g., a gateway module, a local/foreign node, and/or an application delivery controller (ADC)) may recover a URL and/or allow the server to receive the request with the recovered URL. Otherwise, the device may determine that the request is invalid, and can prevent and/or preclude the server from receiving the request. In one example, malicious entities, actors and/or bots may attempt to obtain information of a resource (e.g., directory structure, folders or content/data/path of a webpage) from a server (e.g., a backend server supporting hypertext transfer protocol (HTTP) and/or hypertext transfer protocol secure (HTTPS)) for malicious purposes (e.g., performing price scrapping and/or automatic form submissions). The systems and methods presented herein can prevent the entities and/or bots from obtaining said information by obfuscating/randomizing each URL in a response from the server (e.g., HTTP RESPONSE). By obfuscating the URL(s), a device can remove path or directory structure information of the URL(s) from the response, thereby preventing bots and/or malicious actors from using such information and the response to improperly access other information of a resource (e.g., pricing information of a website).

In one aspect, the present disclosure is directed to a method for preventing unauthorized access, retrieval, storage, and/or usage of information from a resource. The method can include receiving, by a device intermediary between a client (e.g., a smartphone, a laptop, a tablet device, a desktop computer of a user, and/or a client supporting HTTP/HTTPS) and a server in a session, a first request and/or message (e.g., HTTP GET, GET /index.html, and/or other requests) from the client that includes a first uniform resource locator (URL) of the server. The first URL can be used to access a first resource of the server (e.g., a resource, service, and/or application hosted on the server). A URL, such as a first/second URL, can be a URI, a web path, an address, and/or other resource identifiers/locators. In some embodiments, the device may correspond to a cluster of devices comprising one or more devices (e.g., distributed systems). The device may receive a response from the server that includes a second URL. The device may update the response by including a client identifier (e.g., CLIENT_SESSION_ID, CLIENT_PCK, and/or other identifiers) for the session in a set-cookie field (e.g., a set-cookie HTTP header), obfuscating the second URL into a string, and replacing the second URL in the response with the string. The device may receive a second request that includes a candidate client identifier, and a third URL. The device may determine whether the second request is valid, by at least one of: matching the candidate client identifier with the client identifier, and determining whether the second URL is recoverable using the third URL.

In some embodiments, the device may determine a match between the candidate client identifier and the client identifier. Responsive to the match, the device may determine whether the second URL is recoverable using the third URL. When the second URL is recoverable, the device may update the second request by replacing the third URL in the second request with the second URL recovered using the third URL. The device may send the updated second request to the server. In some embodiments, obfuscating the second URL into a string may comprise generating, by the device, a URL identifier unique to the second URL. The device can generate the string by applying a hash function on a combination of the URL identifier, the client identifier and a domain name of the server. In certain embodiments, the device can maintain a mapping between the string and the second URL in mapping data for the session. Determining whether the second URL is recoverable using the third URL may comprise determining, by the device, whether the third URL is in the mapping data as the string. The device may recover the second URL from the mapping data according to the string and the mapping.

In some embodiments, obfuscating the second URL into a string may comprise generating, by the device, a first encryption key using the client identifier and a key of the device. The device may generate the string by performing encryption using the second URL and the first encryption key. In certain embodiments, determining whether the second URL is recoverable using the third URL may comprise generating, by the device, a second encryption key using the candidate client identifier, and the key of the device. The device may perform decryption of the third URL using the second encryption key. In some embodiments, a failure of the decryption may be indicative that the second URL is unrecoverable using the third URL. In certain embodiments, obfuscating the second URL into a string may comprise obfuscating or removing path or directory structure information in the second URL, from being accessible at the client.

In one aspect, the present disclosure is directed to a device intermediary between a client and a server for preventing unauthorized access, retrieval, storage, and/or usage of information from a resource. The device may comprise at least one processor. The at least one processor may be configured to receive, in a session, a first request from the client that includes a first uniform resource locator (URL) of the server. The at least one processor may be configured to receive a response from the server that includes a second URL. The at least one processor may be configured to update the response by including a client identifier for the session in a set-cookie field, obfuscating the second URL into a string, and replacing the second URL in the response with the string. The at least one processor may be configured to receive a second request that includes a candidate client identifier, and a third URL. The at least one processor may be configured to determine whether the second request is valid, by at least one of: matching the candidate client identifier with the client identifier, and determining whether the second URL is recoverable using the third URL.

In some embodiments, the at least one processor may be configured to determine a match between the candidate client identifier and the client identifier. The at least one processor may be configured to determine, responsive to the match, whether the second URL is recoverable using the third URL. When the second URL is recoverable, the at least one processor may be configured to update the second request by replacing the third URL in the second request with the second URL recovered using the third URL. The at least one processor may be configured to send the updated second request to the server. In some embodiments, the at least one processor may be configured to obfuscate the second URL into a string, by generating a URL identifier unique to the second URL. The at least one processor may be configured to generate the string by applying a hash function on a combination of the URL identifier, the client identifier and a domain name of the server. The at least one processor may be configured to maintain a mapping between the string and the second URL in mapping data for the session. The at least one processor may be configured to determine whether the second URL is recoverable using the third URL by determining whether the third URL is in the mapping data as the string. The at least one processor may be configured to determine whether the second URL is recoverable using the third URL by recovering the second URL from the mapping data according to the string and the mapping.

In some embodiments, the at least one processor may be configured to obfuscate the second URL into the string by generating a first encryption key using the client identifier and a key of the device. The at least one processor may be configured to obfuscate the second URL into the string by generating the string by performing encryption using the second URL and the first encryption key. The at least one processor may be configured to determine whether the second URL is recoverable using the third URL by generating a second encryption key using the candidate client identifier, and the key of the device. The at least one processor may be configured to determine whether the second URL is recoverable using the third URL by performing decryption of the third URL using the second encryption key.

In one aspect, the present disclosure is directed to a non-transitory computer readable medium storing program instructions for preventing unauthorized access, retrieval, storage, and/or usage of information from a resource. The program instructions stored in a non-transitory computer readable medium may cause at least one processor to receive, in a session, a first request from the client that includes a first uniform resource locator (URL) of the server. The at least one processor may reside in a device intermediary between a client and a server. The program instructions can cause the at least one processor to receive a response from the server that includes a second URL. The program instructions can cause the at least one processor to update the response by including a client identifier for the session in a set-cookie field, obfuscating the second URL into a string, and replacing the second URL in the response with the string. The program instructions can cause the at least one processor to receive a second request that includes a candidate client identifier, and a third URL. The program instructions can cause the at least one processor to determine whether the second request is valid, by at least one of: matching the candidate client identifier with the client identifier, and determining whether the second URL is recoverable using the third URL.

In some embodiments, the program instructions can cause the at least one processor to determine a match between the candidate client identifier and the client identifier. Responsive to the match, the program instructions can cause the at least one processor to determine whether the second URL is recoverable using the third URL.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Certain protocols (e.g., hypertext transfer protocol (HTTP), hypertext transfer protocol secure (HTTPS), secure sockets layer (SSL), transport layer security (TLS), and/or other protocols) may execute one or more methods (e.g., HTTP GET and/or other methods) that are vulnerable to unauthorized/malicious attempts to access information from one or more resources (e.g., via one or more uniform resource locators (URLs) of a web server/service). For example, certain approaches (e.g., start uniform resource locator (URL) check, and/or other approaches) may provide, use, and/or configure at least one point of entry/access (e.g., allowed URLs and/or start URLs) to a server, a service, and/or a resource. An authorized user may use the point(s) of entry to access the resource, server, and/or service, to navigate/traverse to other resources (e.g., closure URLs), and/or to obtain information from resources. However, said approaches may fail to provide adequate protection against unauthorized attempts (e.g., attempts by bots and/or malicious actors) to randomly access, retrieve, and/or use information of the other resources, using for example path or directory structure information that can be extracted from the point(s) of entry.

For instance, a bot and/or malicious actor can crawl, visit, and/or access a webpage (or other resources) and/or a server to obtain and/or store the content/information/data of the webpage. The bot/actor may obtain/store information of the webpage for malicious purposes, such as performing web scraping (e.g., price scrapping) without permission of an owner of the webpage. For example, a bot may perform price scrapping to maliciously monitor, track, and/or access pricing information of a rival/competitor, with the goal of undercutting said rival/competitor to boost/increase sales of a product. In certain scenarios, the bot/actor may store/maintain the obtained pricing information from the webpage to perform automatic form submissions and/or create a fake user account/profile (e.g., spamming content on one or more servers). The systems and methods described herein can detect and/or prevent bots/actors from performing unauthorized web scrapping and/or automatic form submissions in distributed systems in real time.

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for preventing unauthorized access to information from a resource.

A. Network and Computing Environment

Figure 1A:
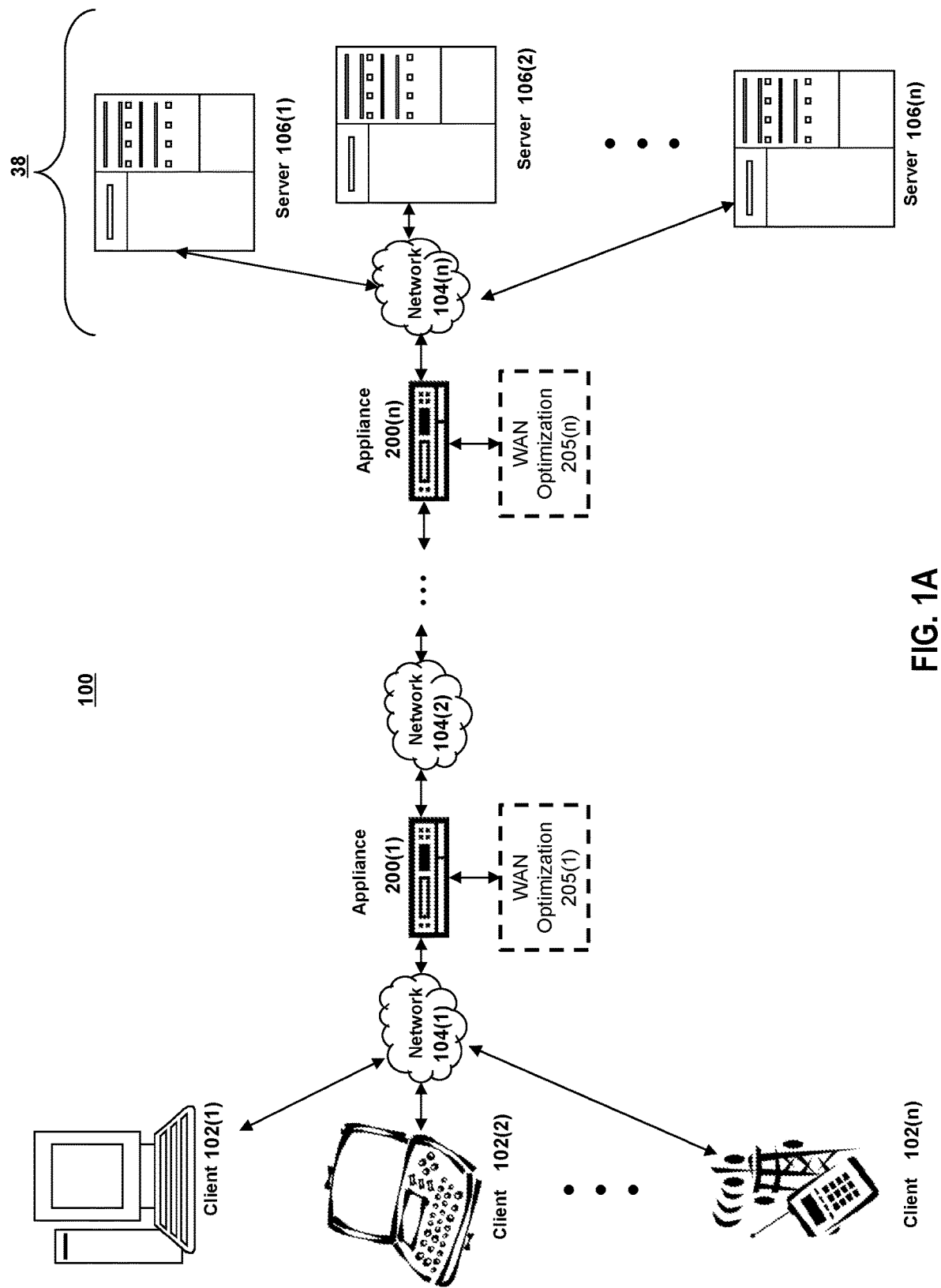
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, FL.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, FL.

Figure 1B:
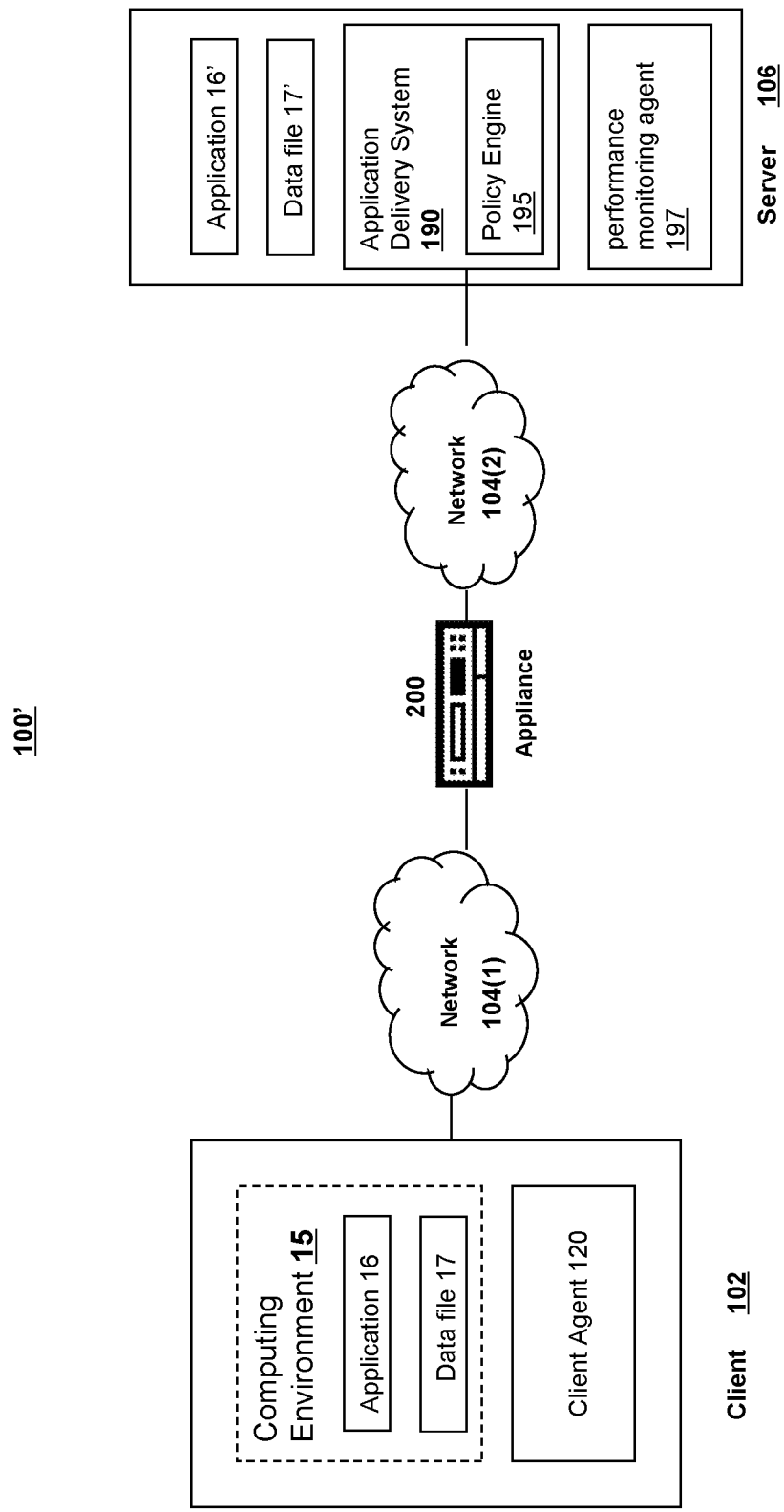
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, FL The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, FL.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
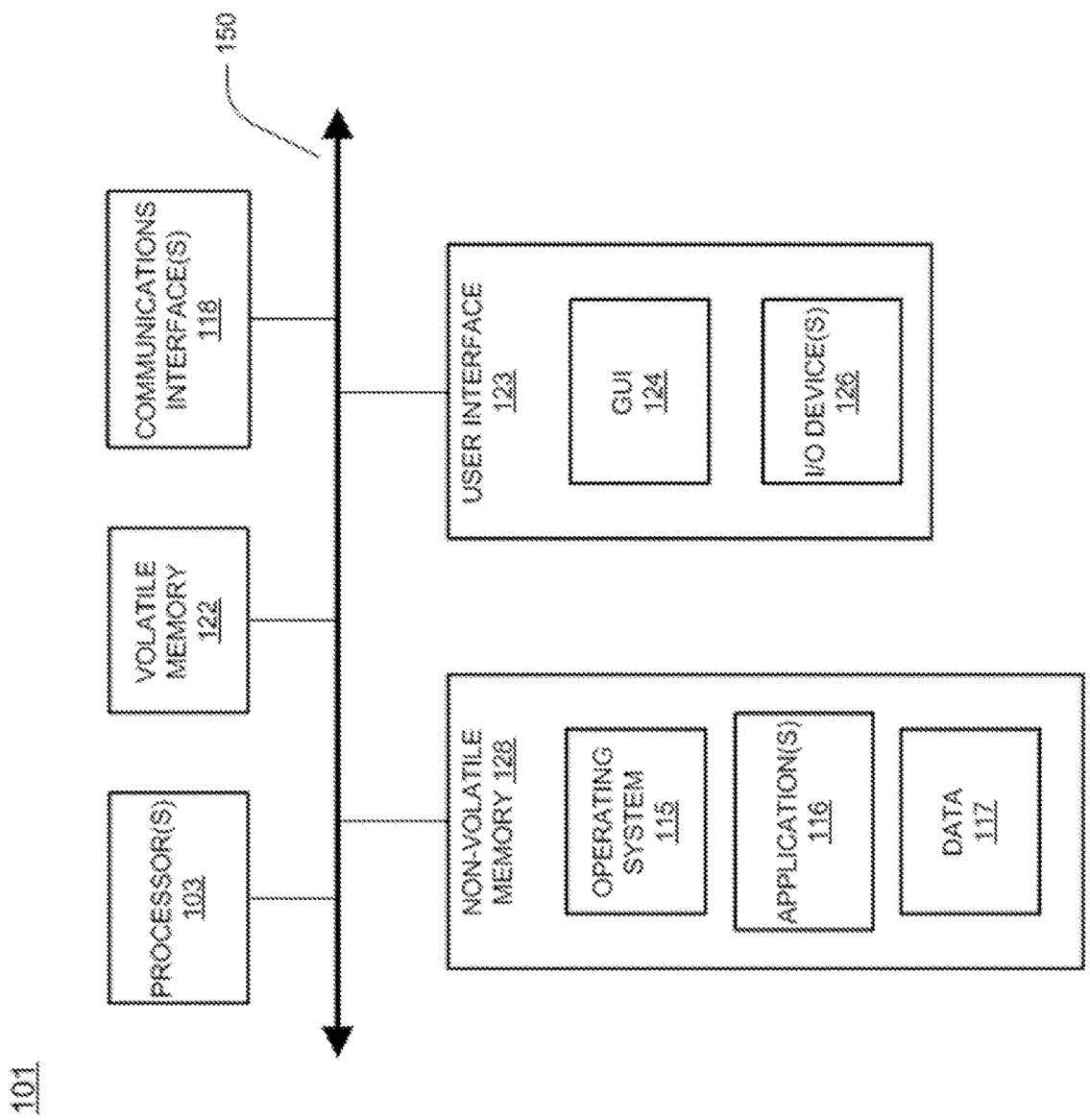
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, FL, the teachings of which are hereby incorporated herein by reference.

B. Appliance Architecture

Figure 2:
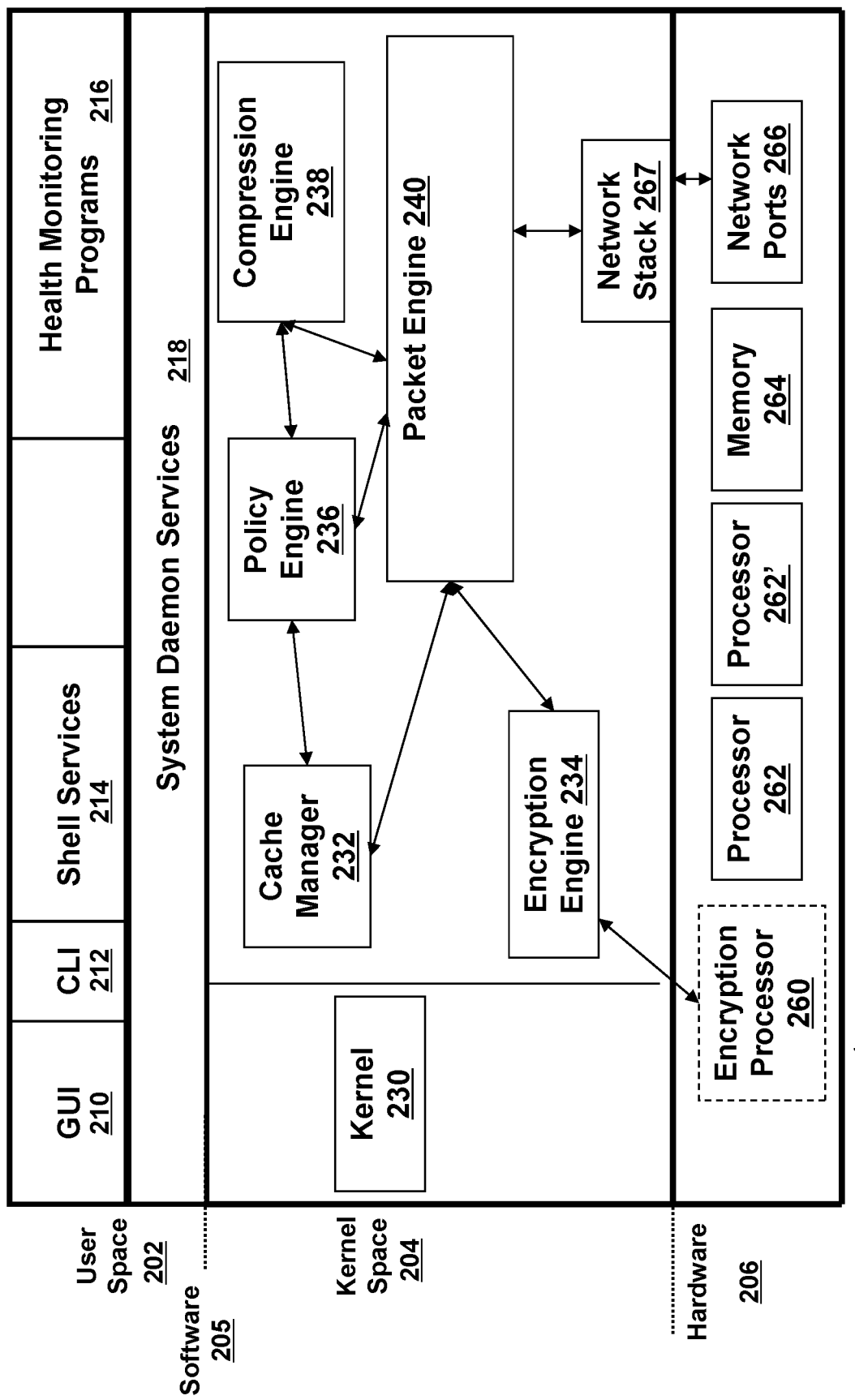
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, FL Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, FL, the teachings of which are hereby incorporated herein by reference.

C. Systems and Methods for Preventing Unauthorized Access to Information from a Resource The systems and methods presented herein include a novel approach for preventing unauthorized access, retrieval, storage, and/or usage of information from one or more resources (e.g., via URLs in requests). The novel approach includes one or more mechanisms to validate, confirm, and/or verify whether a request/message (e.g., a HTTP REQUEST URL) to access a resource (e.g., via a URL) is a valid request. Therefore, the novel approach may prevent random, unauthorized, and/or malicious access to information (e.g., pricing information) from a resource (e.g., a web server/service). Compared to present technology, certain embodiments of the systems and methods presented herein (e.g., encryption-based approaches) may reduce/decrease memory usage by at least 35% (e.g., 45, 55 or other percent) for instance, by relying on more processing resource for example. Other embodiments (e.g., hash-based approaches) may increase processing efficiency (e.g., CPU efficiency) by at least 25% (e.g., 35, 45 or other percent) for example, by relying on more memory usage for instance.

The present disclosure is directed towards systems and methods for preventing malicious entities and/or bots from gaining unauthorized access to information from a resource/service by obfuscating and/or randomizing each URL in a response from the server (e.g., HTTP RESPONSE). For instance, a device (e.g., a gateway module, a local/foreign node, network appliance and/or an application delivery controller (ADC)) intermediary between a client and a server may receive, obtain, and/or process a first request from the client (e.g., a smartphone, a laptop, a tablet device, a desktop computer of a user, and/or a client supporting HTTP/HTTPS). Responsive to receiving the first request/message (e.g., HTTP GET, GET /index.html, and/or other requests), the device may create, generate, configure, and/or establish a session between the client and the server. In some embodiments, the device may create, generate, configure, establish, and/or assign a unique client identifier (e.g., CLIENT_SESSION_ID and/or CLIENT_PCK) for the client and/or at least one key of the device (e.g., ENC_KEY). In some embodiments, the device may create and/or assign the client identifier and/or the key(s) responsive to receiving the first request. In some embodiments, the key(s) may include or correspond to a token and/or other information that is preconfigured across one or more devices in a system (e.g., a distributed system). The key(s) may be valid/active for a configured and/or predetermined time interval or time instance. The key(s) can be updated and/or adjusted across one or more time instances and/or time intervals. In some embodiments, the key(s) can be used, accessed, shared, and/or stored by one or more devices (e.g., one or more ADCs) of a system.

In some embodiments, the first request (e.g., an HTTP GET request and/or other requests) may include, provide, specify, and/or indicate a first URL to access a first resource of the server (e.g., a resource, service, and/or application hosted on the server). Responsive to receiving and/or obtaining the first request, the device may forward, send, communicate, transmit, and/or broadcast the first request to the server. Upon receiving the first request, the server may send, transmit, and/or communicate a response (e.g., an HTTP response) to the device, wherein the response can include, specify, and/or indicate one or more resources (e.g., HTTP RESPONSE URLs). In some embodiments, the device may process, parse, analyze, and/or evaluate the received response (e.g., HTTP RESPONSE) to identify, for instance, each of the URLs (e.g., second URLs) in the response. For each URL in the response, the device can obfuscate, obscure, hide, and/or randomize the URL into a string (e.g., a hash value and/or an encrypted version of the URL). Responsive to obfuscating the URL(s), the device may update and/or modify the response by replacing each URL with a corresponding string (e.g., an obfuscated version of the URL), so that the client or any entity intercepting the response/string would not be able to determine or extract path, folder or directory structure information embedded/incorporated in the URL or inferable from the URL, for instance.

In some embodiments, the device may update and/or adjust the response by including the client identifier in a set-cookie field (e.g., performing a set-cookie command with the client identifier). By including the client identifier in a set-cookie field, subsequent requests from the client to access a resource may include, provide, specify, and/or indicate a cookie (e.g., a HTTP cookie configured by the set-cookie command), wherein the cookie can include or correspond to the client identifier. Responsive to updating the received response from the server, the device may send, transmit, forward, and/or communicate the response to the client. The response may include, provide, specify, and/or indicate the modified/updated URL(s), the client identifier, and/or other information.

In some embodiments, the device may receive a subsequent request (e.g., a second request) that includes a third URL and/or a candidate client identifier. The device may extract, obtain, acquire, and/or use the candidate client identifier from the subsequent request (e.g., from the HTTP REQUEST HEADER or cookie information/field of the subsequent request). In some embodiments, the device may validate, verify, and/or confirm the candidate client identifier of the subsequent request. For example, the device may compare the candidate client identifier with the client identifier assigned, generated, and/or maintained by the device. If the candidate client identifier corresponds to (e.g., matches or is within a defined range/extent of) the client identifier of the device, the device may proceed with determining whether at least one URL (e.g., a second URL) from the response is recoverable using the third URL. For instance, the device may determine whether the at least one URL is recoverable by determining whether the third URL is included in a mapping data (e.g., URL MAPPING DATA) as a string (e.g., a hash value). In another example, the device may determine whether the at least one URL is recoverable by performing decryption of the third URL based on an encryption key (e.g., calculated according to the candidate client identifier and/or the key of the device). If the at least one URL is recoverable (e.g., subsequent request is valid), the device may replace the third URL in the subsequent request with the recovered URL and/or allow the server to receive the subsequent request. Otherwise (e.g., subsequent request is invalid), the device may determine to prevent and/or preclude the server from receiving the subsequent request (e.g., the device may drop the subsequent request).

Figure 3:
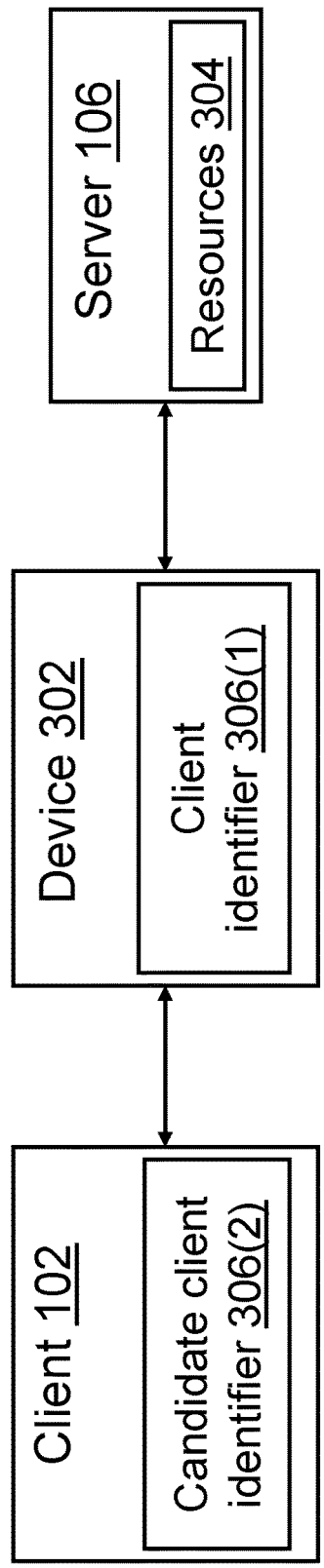
FIG. 3 is a block diagram of a system for preventing unauthorized access to (e.g., retrieval, storage, and/or usage of) information from a resource, in accordance with an illustrative embodiment.

In view of the above discussion regarding preventing unauthorized access of resource information, a process and/or system for performing said prevention (e.g., via a client identifier and/or obfuscation of a URL) may be beneficial, as further explained in the following passages. Referring to FIG. 3, depicted is a block diagram of one example embodiment of a system 300 for preventing unauthorized access, retrieval, storage, and/or usage of information from a resource. The system 300 may include one or more clients 102 of an entity (e.g., an organization or a corporate entity), one or more devices 302, and/or one or more servers 106 hosting one or more resources 304. The device 302 can include or maintain or have access to at least one client identifier 306(1). The client 102 can include or maintain or have access to at least one candidate client identifier 306(2).

Each of the above-mentioned elements or entities is implemented in hardware, or a combination of hardware and software, in one or more embodiments. Each component of the system 300 may be implemented using hardware or a combination of hardware or software detailed above in connection with FIG. 1C. For instance, each of these elements or entities can include any application, program, library, script, task, service, process or any type and form of executable instructions executing on hardware of a client device 102, a server 106 and/or a network device 200 in connection with FIGS. 1B-1C, for instance. The hardware includes circuitry such as one or more processors in one or more embodiments.

The system 300 may include one or more servers 106. The server 106 (e.g., a backend server supporting HTTPS messages or transactions, and/or other servers 106) may be configured and/or designed to host one or more resources 304 (e.g., one or more URLs) and/or services (e.g., application resources, as a web application, SaaS application or remote-hosted network application). The server 106 may be configured and/or designed to provision the one or more resources 304 and/or services to one or more clients 102 of a consumer or other entity (e.g., an organization or user), via one or more networks 104. For example, the client 102 may establish one or more sessions or connections (e.g., secured or otherwise, such as a SSL virtual private network connection) with the server(s) 106 to access a service/resource 304 (e.g., via one or more URLs), such as an application resource. In another example, the server(s) 106 may receive/obtain a request (e.g., a first/second request, such as a HTTP request) from the client 102 (e.g., via a device 302) to access/use one or more resources 304 (or establish the connections to access the one or more resources 304). The server(s) 106 may receive/obtain a first URL and/or other information via the request. For example, a first request may include, specify, indicate, and/or provide the first URL and/or other information.

Responsive to receiving the request(s), the server(s) 106 may send, transmit, and/or communicate a response to the client 102 via the device 302. The server(s) 106 may provide, indicate, and/or specify one or more URLs (e.g. one or more second URLs) and/or other information via the response. For example, the response from the server(s) 106 may indicate and/or include one or more second URLs to access one or more resources 304. The one or more second URLs may be associated and/or mapped to the first URL of the request (e.g., first request) received by the server 106. For instance, the first URL can be a parent URL to each of the second URLs in the response from the server 106.

In some embodiments, the server(s) 106 can be part of a cloud or datacenter for instance. The server(s) 106 may include any embodiment of volatile memory 122 or nonvolatile memory 128 (discussed in FIG. 1C for example) which may store files, data and/or content of the service. The server(s) 106 may communicate with other various components of the system 300 in FIG. 3 via a communications interface 118 for instance. Hence, the server(s) 106 may be similar in some aspects to the computer 101 described with reference to FIG. 1C.

To provide a service/resource 304, the server(s) 106 may execute, provide, provision, and/or host one or more network application(s). In some embodiments, a service/resource 304 may be referred to interchangeably with an application, application resource or network application. A network application can for instance include a remote-hosted application, a remote-hosted desktop, a web application or a software-as-a-service (SaaS) application. A remote-hosted desktop may be a virtual desktop hosted on the server 106 which is accessed by or remotely provisioned to the client 102. In some embodiments, the delivery of a remote-hosted desktop may be via a session and/or connection based on High-Definition User Experience (HDX) or Independent Computing Architecture (ICA) display remoting protocol, or Remote Desktop Protocol (RDP). A remote-hosted application may include/correspond to an application service that can be delivered via a HDX-based, ICA-based, RDP-based, etc., session and/or connection. In some embodiments, a remote-hosted application may be an application which is installed on/in the remote-hosted desktop environment and is therefore accessible within the remote-hosted desktop. A SaaS application can be a centrally-hosted application which is typically accessible on a subscription basis. In some embodiments, the SaaS applications may include web-based applications. In other embodiments, the SaaS applications may correspond to remote-hosted applications and, therefore, can be delivered in HDX/ICA/RDP-based sessions and/or connections. SaaS applications and/or web applications may include for instance salesforce.com, SAP, Microsoft Office 365, Dropbox or Gmail service, Amazon web services, and so on.

The system 300 may include one or more clients 102. The client 102 may include or correspond to devices of a consumer of the service. For example, if the consumer is an individual or user, the client 102 may comprise a smartphone, a laptop (e.g., at home), a tablet device, and a desktop computer (e.g., at work), that the user may use to access an application resource (e.g., Dropbox service) and/or other resources 304 at various times and/or locations for instance. In an example where the consumer is an organization, such as an enterprise, the consumer can extend over a number of users (e.g., management persons, staff members, IT administrators, and so on) and their associated client(s) 102 or devices (e.g., corporate-issued device, personally-owned devices, and/or registered/approved devices (e.g., in a BYOD program)). Any number of the users may access a service/resource 304 (e.g., salesforce.com, SAP, Microsoft Office 365) from a service/resource 304 provider, via a corporate account for the service/resource 304 for instance.

The client 102 may be configured and/or designed to access one or more application resource(s) 304 over one or more networks. In some embodiments, the client 102 may interact with the server(s) 106 via a device 302 (e.g., a device 302 intermediary between the client 102 and the server(s) 106). For example, the client 102 may send a request (e.g., a first request, a second request, and/or other requests to access/use a resource 304) and/or message (e.g. a HTTP message and/or other messages) to the server(s) 106 via the device 302.

The request may include and/or specify a URL (e.g., a first URL) of the server(s) 106. As such, the request may include or correspond to a request to access/use/traverse the URL of the request, and/or obtain information from the resource associated with the URL. Responsive to sending the request/message, the client 102 may receive/obtain a response from the server 106 and/or a device 302 (e.g., an ADC and/or other devices). For example, responsive to receiving a request, the server 106 may send a response to the client 102 via the device 302. The response may include one or more URLs (e.g., second URLs) and/or other information. The device 302 may obfuscate some aspects (e.g., URLs) of the response. In some embodiments, the client 102 may receive one or more URLs (e.g., obfuscated second URLs) and/or a client identifier 306(1) via the response from the device 302. As discussed herein, references to a resource may sometimes refer to an identification/indication/indicator of the resource (e.g., as a uniform resource indicator), and may sometimes refer to the resource itself. In some embodiments, the client 102 may send a second request directed to the server 106 (via the device 302) that includes the one or more obfuscated URLs from the server response. The second request (e.g., HTTP GET request) may include and/or provide at least one URL of the URLs from the server response (e.g., a third URL), and/or a candidate client identifier 306(2). The at least one URL of the second request may include or correspond to a second URL from the response obfuscated into a string (e.g., a hash value and/or an encrypted version of the URL).

The system 300 may include one or more devices 302 (sometimes referred to as appliance(s) 200, gateway(s) 200, node(s), and/or application delivery controllers). A device 302 may be configured and/or designed to serve as an intermediary between different elements of a computer and/or network environment, such as between client(s) 102, server(s) 106, network(s) 104, and/or other devices 302 (e.g., as discussed above in connection with FIG. 2). In some embodiments, the device 302 may receive/obtain a first request/message (e.g., HTTP GET request and/or other requests) from a client 102 and/or user to access one or more resources 304 from the server 106. The first request may include, provide, and/or specify a first URL for accessing a resource 304 and/or information from a resource 304. Responsive to receiving the request/message, the device 302 may create, generate, and/or establish a session between the client 102 and the server 106. The device 302 may generate, configure, and/or assign a client identifier 306(1) (e.g., CLIENT_SESSION_ID and/or CLIENT_PCK) for the client 102 and/or a key of the device 302. The device 302 may store and/or maintain the client identifier 306(1) and/or the key of the device 302. The client identifier 306(1) may include or correspond to a client ID, a client token and/or other information that uniquely identifies the client 102, the session, and/or the details of the session (e.g., messages/requests/resources exchanged during a session). The client identifier 306(1) and/or the session may be valid for a configured/predetermined timeout or expiration interval/instance. The session and/or client identifier 306(1) may be used to track/monitor the resources 304 accessed/used by the client 102.

In some embodiments, the device 302 may send, forward, and/or route the first request to the server 106. Responsive to sending/transmitting the first request, the device 302 may receive a response from the server 106. The device 302 may parse, analyze, and/or evaluate the response from the server 106 to obtain, extract, and/or acquire one or more second URLs from the response. For each second URL in the response, the device 302 may obfuscate and/or obscure the second URL into a string (e.g., to remove path/folder/directory information in or obtainable from the second URL). For instance, the device 302 may obfuscate each of the second URL(s) into a corresponding/unique string by applying a hash function on a combination of a unique URL identifier (e.g., generated by the device 302 for each second URL), the client identifier 306(1), and/or a domain name of the server 106 (e.g., SHA_MODIFIED_HTTP_URL=SHA{UNIQUE_URL_NUMBER, DOMAIN_NAME, CLIENT_ SESSION_ID}). As such, each particular string can be unique/specific to a particular resource 304 (e.g., the resource indicated by the second URL) hosted by the server 106 with the domain name, and/or to the session and/or the client. In another example, the device 302 may obfuscate the second URL(s) into a corresponding/unique string by performing encryption of the second URL using a first encryption key (e.g., encrypt (second URL, first encryption key)). The device 302 may determine and/or generate the first encryption key according to (e.g., by combining and/or appending) the key of the device 302 and/or the client identifier 306(1) (e.g., ENCRYPTION_KEY={ENC_KEY, CLIENT_PCK}). In some embodiments, the device 302 may update, adjust, and/or modify the response by including the client identifier 306(1) in a set-cookie field (e.g., set-cookie HTTP header). In certain embodiments, the device 302 may update the response by adding, incorporating, replacing, and/or exchanging the second URL(s) from the response with a corresponding string (e.g., an obfuscated version of the second URL). Responsive to updating the response, the device 302 may forward/send the updated response to the client 102.

In some embodiments, the device 302 may receive another request (e.g., a second request) from a client 102 and/or user. The second request may include, indicate, and/or specify at least one URL, such as a third URL (e.g., an obfuscated URL), to the device 302. The device 302 may receive and/or obtain a candidate client identifier 306(2) (e.g., in cookie information/field of the second request), the third URL, and/or other information via the second request (e.g., the second request can include a candidate client identifier 306(2) and/or the third URL). The device 302 may extract, acquire, determine, and/or identify the candidate client identifier 306(2) and/or the third URL from the second request. Responsive to extracting the candidate client identifier 306(2) (or other information), the device 302 may validate, confirm, and/or verify the candidate client identifier 306(2). For example, the device 302 may determine whether the candidate client identifier 306(2) corresponds to (e.g., matches or is within a defined range/extent of) the client identifier 306(1) generated and/or maintained by the device 302. If the candidate client identifier 306(2) fails to correspond to the client identifier 306(1), the device 302 may determine that the second request is invalid, and therefore may prevent the server 106 from receiving the second request with the third URL (e.g., the device 302 may drop/block the second request). If, on the other hand, the candidate client identifier 306(2) corresponds to the client identifier 306(1), the device 302 may proceed with determining whether at least one second URL from the response is recoverable/retrievable using the third URL.

In some embodiments, the device 302 may determine whether at least one second URL is recoverable by determining whether the obfuscated third URL (e.g., a hash value and/or an encrypted URL) is in a mapping data (e.g., whether the third URL is mapped to or corresponds to at least one second URL). The mapping data can indicate and/or specify a mapping/association/relationship between a second URL from the response and a corresponding string (e.g., a hash value). In another example, the device 302 may determine whether at least one second URL is recoverable by performing a decryption or decoding of the third URL using a second encryption key (e.g., generated by the device 302 using the candidate client identifier 306(2) and/or the key of the device 302). If, for example, the performed decryption fails (e.g., the device 302 is unable to decrypt the third URL using the second encryption key, or to successfully perform or complete the decryption), the second URL may be unrecoverable using the third URL. If the device 302 determines that the second URL is recoverable, the device 302 may update, adjust, and/or modify the second request by replacing the third URL (e.g., an obfuscated URL) with the recovered second URL (e.g., an original URL, prior to obfuscation). Responsive to updating the second request, the device 302 may determine to allow the server 106 to receive the updated second request (e.g., the client 102 can access, use, and/or traverse the resource 304 associated to the third URL). If, instead, the device 302 determines that the second URL is unrecoverable, the device 302 may prevent the server 106 from receiving the second request (e.g., the device 302 may determine the request is malicious and/or potentially malicious). By dropping or blocking the second request from reaching the server 106, the device 302 can prevent a client 102 (e.g., a potential attacker) from accessing, using, and/or traversing a resource 304 and/or information from the resource 304 associated with the third URL indicated in the second request.

In some embodiments, the device 302 may be located at any one of various points or in any of various communication paths, for example between two networks 104, within a computing and/or network environment 100. In other embodiments, the device 302 may be located on a network 104. One or more devices 302 may communicate with one another and/or work in conjunction to, for example, accelerate, protect and/or secure network traffic between clients 102 and servers 106 and/or provide load balancing of servers 106 to process requests from clients 102. In some embodiments, the one or more devices 302 may act as a proxy or access server to provide access to the one or more servers 106, provide security and/or act as a firewall between the client 102 and the server 106, and/or provide a secure VPN connection from the client 102 to the server 106, such as a SSL VPN connection and/or provide encryption and decryption operations.

In some embodiments, the device 302 and/or the client 102 can include, among other elements, one or more client identifiers 306, such as a generated client identifier 306(1) and/or a candidate client identifier 306(2). The client identifier 306(1) generated by the device 302 may be configured and/or designed to uniquely identify or map to the client 102, the session (e.g., a session between a client 102 and a server 106), and/or the details of the session (e.g., messages/requests/resources exchanged during a session). In some embodiments, the client identifier 306(1) and/or the candidate client identifier 306(2) may include or correspond to a token and/or other information that uniquely identifies the client 102. In some embodiments, the client identifier 306(1) may be valid/active for a configured and/or predetermined time interval or time instance. The client identifier 306 may be used to track/monitor the resources (e.g., HTTPS URLs) accessed, used, and/or visited by the client 102 during the session. In some embodiments, the client identifier 306(1) can be used, accessed, and/or stored by one or more devices 302 (e.g., one or more ADCs) of a system (e.g., a distributed system). In some embodiments, the client identifier 306(1) and/or the candidate client identifier 306(2) can be used to perform a primary authentication (e.g., a first level check) of a request to access a resource 304. For instance, a candidate client identifier 306(2) can be compared with the client identifier 306(1) assigned by a device 302 (e.g., assigned to a client 102), in order to determine whether the request is a malicious attempt to access a resource 304. If the candidate client identifier 306(2) fails to match (e.g., is not consistent with, or conflicts with) the client identifier 306(1) assigned by the device 302, the device 302 may determine to prevent the server 106 from accessing the resource 304 and/or information from the resource. In some embodiments, the client identifier(s) 306 may be stored/maintained in a cache of the device 302, a memory 264 of the device 302, and/or a physical memory having a faster access time than memory 264. The client identifier(s) 306 may be located/maintained within or apart from the device 302.

Figure 4:
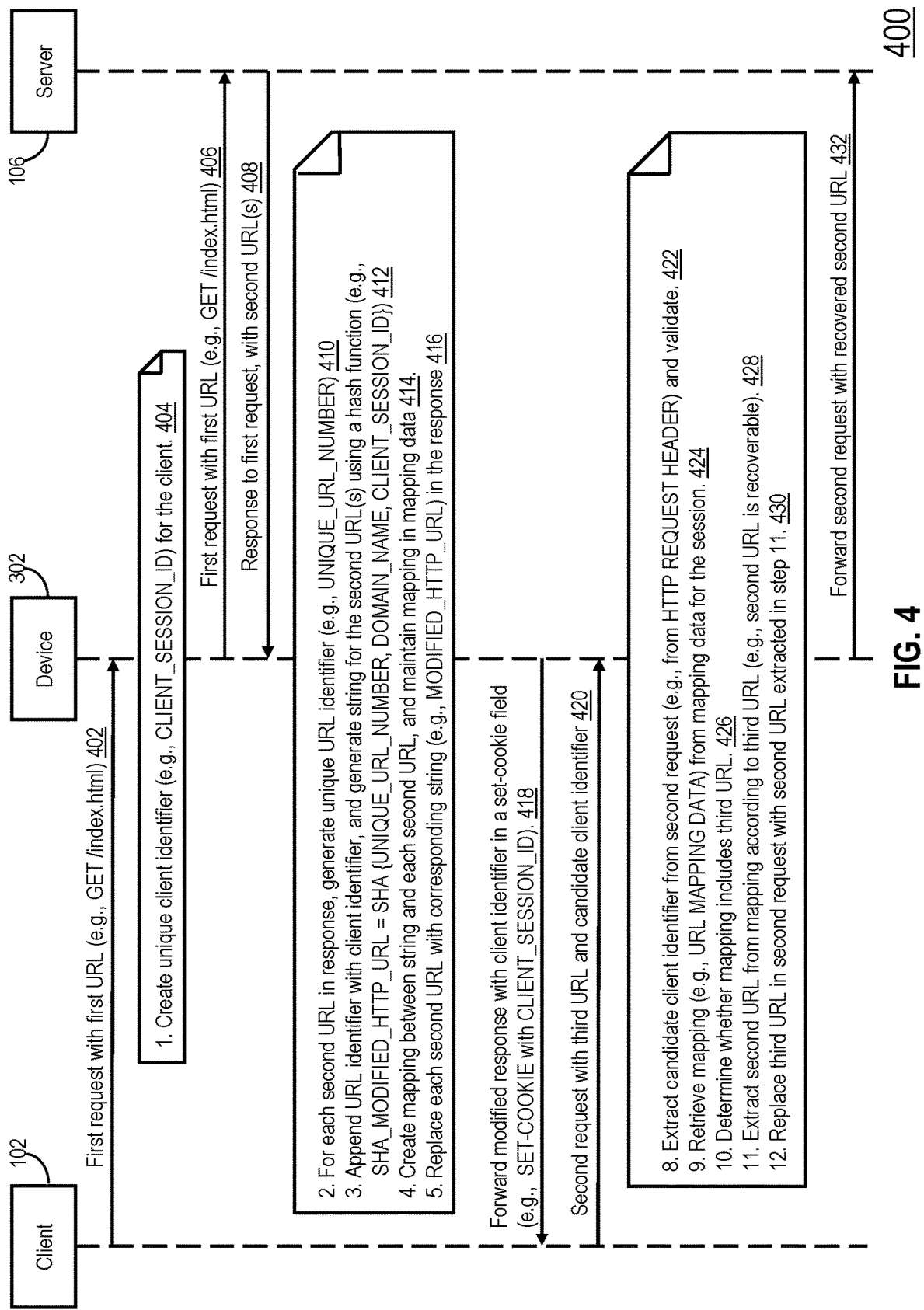
FIG. 4 is a communication diagram of a system for preventing unauthorized access to information from a resource, in accordance with an illustrative embodiment.

Referring now to FIG. 4, depicted is a communication diagram of an embodiment of a process 400 for preventing unauthorized access, retrieval, storage, and/or usage of information from a resource. In accordance with process 400, the client 102 may send, transmit, and/or communicate a first request/message (e.g., HTTP GET, GET /index.html, and/or other requests) to the server 106 via the device 302 (402). The first request (e.g., HTTP REQUEST) may include a first URL (e.g., /index.html and/or other resources) of the server 106 and/or other information. Responsive to receiving and/or obtaining the first request from the client 102, the device 302 may create, generate, configure, establish and/or assign a unique/new client identifier 306(1) (e.g., CLIENT_SESSION_ID, a client token, and/or other information) for the client 102 (404), in some embodiments. The client identifier 306(1) may be used to track and/or monitor the resource(s) 304 (e.g., HTTP URLs) accessed by the client 102 during a session. For instance, during a session, the client identifier 306(1) can be used to identify/update a repository (or other storage) and/or history of resources 304 accessed by the client 102. In some embodiments, the client identifier 306(1) can be used to generate, create, compute, and/or calculate a unique string (e.g., a hash value) for at least one URL (e.g., a second URL). In some embodiments, the client identifier 306(1) may be used to determine whether a received request (e.g., a second request to access a resource 304) is valid. The device 302 may store and/or maintain the client identifier 306(1) in the data/information of the session.

In some embodiments, the device 302 may forward, send, route, and/or communicate the first request (e.g., GET /index.html) to the server 106 (406). The server 106 may receive and/or obtain the first request (e.g., a request to access a first resource 304(1)) from the device 302 (406) and/or send/transmit a response (e.g., response for index.html and/or other HTTP responses) to the device 302 (408). The response from the server 106 may include, provide, and/or specify one or more second URLs and/or other information. Responsive to receiving the response from the server 106, the device 302 may parse, analyze, and/or evaluate the response (e.g., HTTP response page) from the server 106 (e.g., to identify each second URL). For each second URL in the server response, the device 302 may generate, determine, and/or assign a unique URL identifier (e.g., UNIQUE_URL_NUMBER) (410). The unique URL identifier(s) can be accessed and/or shared by one or more clients 102 across sessions. Responsive to determining the URL identifier(s), the device 302 may append, combine, and/or incorporate the client identifier 306(1) with the URL identifier(s). The device 302 may use the URL identifier(s), combined with the client identifier 306(1), to determine a string for each second URL (to use to obfuscate information in the second URL), such as a hash value (e.g., a cryptographic hash value) (412). For example, the device 302 may determine and/or generate the string (e.g., SHA_MODIFIED_HTTP_URL) by applying and/or using a hash function (e.g., secure hash algorithm (SHA) function and/or other hash functions) on a combination of the URL identifier(s), the client identifier 306(s), and/or a domain name of the server 106 (or other addresses). The string(s) can be unique and/or valid to a particular client 102 (e.g., the client 102 sending the first request) and/or session (e.g., a session between the client 102 and the server 106).

Once the device 302 generates/determines the string(s), the device 302 can create, determine, generate, configure, store, and/or maintain a mapping and/or association (e.g., URL MAPPING) between each string and a corresponding second URL (414). The mapping can indicate a particular string is associated, mapped, and/or related to a specific URL (e.g., second URL). As such, each particular string included in the mapping can be used (e.g., by a client 102 and/or a device 302) to specify, indicate, and/or identify a particular URL (e.g., a second URL from the response). The device 302 may store and/or maintain the mapping in mapping data for the session (e.g., particular to the session and/or client 102).

In some embodiments, the device 302 can update, modify, and/or adjust the received response from the server 106 (416). For example, the device 302 may update the response by replacing, substituting, exchanging, swapping, and/or switching each second URL with a corresponding string (e.g., hash value calculated based on a combination of the unique URL identifier, the client identifier 306(1), and/or the domain name of the server 106). By replacing each second URL with the corresponding string, the device 302 may obfuscate the second URL(s) into the string(s), thereby making the original second URL(s) inaccessible or unavailable to the client 102 (or a bot) to read/parse. In addition to modifying each second URL, the device 302 may further update the response by including and/or incorporating the client identifier 306(1) (and/or other information) in a set-cookie field (e.g., a set-cookie HTTP header) of the response. For instance, the device 302 may perform a set-cookie command with the client identifier 306(1). As such, subsequent requests to access a resource 304 can provide, specify, and/or indicate a candidate client identifier 306(2) (e.g., an HTTP cookie CLIENT_SESSION_ID).

In some embodiments, the device 302 may send, forward, transmit, route, and/or communicate the updated/modified response from the server 106 (e.g., the response including the modified second URL(s) and/or the client identifier 306(1)) to the client 102 (418). Responsive to receiving the updated response, the client 102 may send or transmit a second request (e.g., GET request and/or other requests) to the server 106 via the device 302 within the session (420). The second request may include, indicate, and/or specify a third URL (e.g., obfuscated into a corresponding string), a candidate client identifier 306(2) and/or other information. The second request may include or correspond to a request to access and/or use a resource 304 of the server 106. In some embodiments, the device 302 may extract the candidate client identifier 306(2) (e.g., included in a HTTP REQUEST HEADER as a cookie of the second request) to determine whether the candidate client identifier 306(2) (provided by the client 102, e.g., as a cookie) is valid (e.g., whether the candidate client identifier 306(2) matches or corresponds to the client identifier 306(1) stored/calculated by the device 302) (422). If the device 302 determines the candidate client identifier 306(2) of the second request is invalid, the device 302 may drop the second request, and therefore prevent/preclude the server 106 from receiving the second request. Otherwise (e.g., if the candidate client identifier 306(2) is valid), the device 302 may proceed with step 424 of process 400.

Responsive to receiving and/or obtaining the second request, and/or responsive to determining the candidate client identifier 306(2) is valid, the device 302 may extract, obtain, check, retrieve, and/or acquire the mapping from the mapping data for the session (424). Once the device 302 retrieves the mapping, the device 302 may determine whether at least one second URL (from the server response) is recoverable/retrievable based on (or by using) the third URL of the second request. For instance, the device 302 may determine whether the mapping includes the third URL (e.g., whether the mapping includes a string corresponding to (or associated with) the third URL) (426). If the mapping includes the third URL, at least one second URL from the response is recoverable according to the third URL (e.g., the second request is valid). As such, the device 302 can extract, obtain, identify, and/or determine the at least one second URL from the mapping, according to the third URL (428). For instance, the device 302 may determine the at least one second URL from the mapping by identifying the second URL associated with (mapping to) the third URL. In some embodiments, the device 302 may update, change, and/or modify the second request by replacing the third URL in the request (e.g., an obfuscated URL) with the recovered second URL (e.g., determined from the mapping) (430). The device 302 may allow the server 106 to receive the second request by forwarding, sending, transmitting, and/or routing the second request to the server 106 (432).

Figure 5:
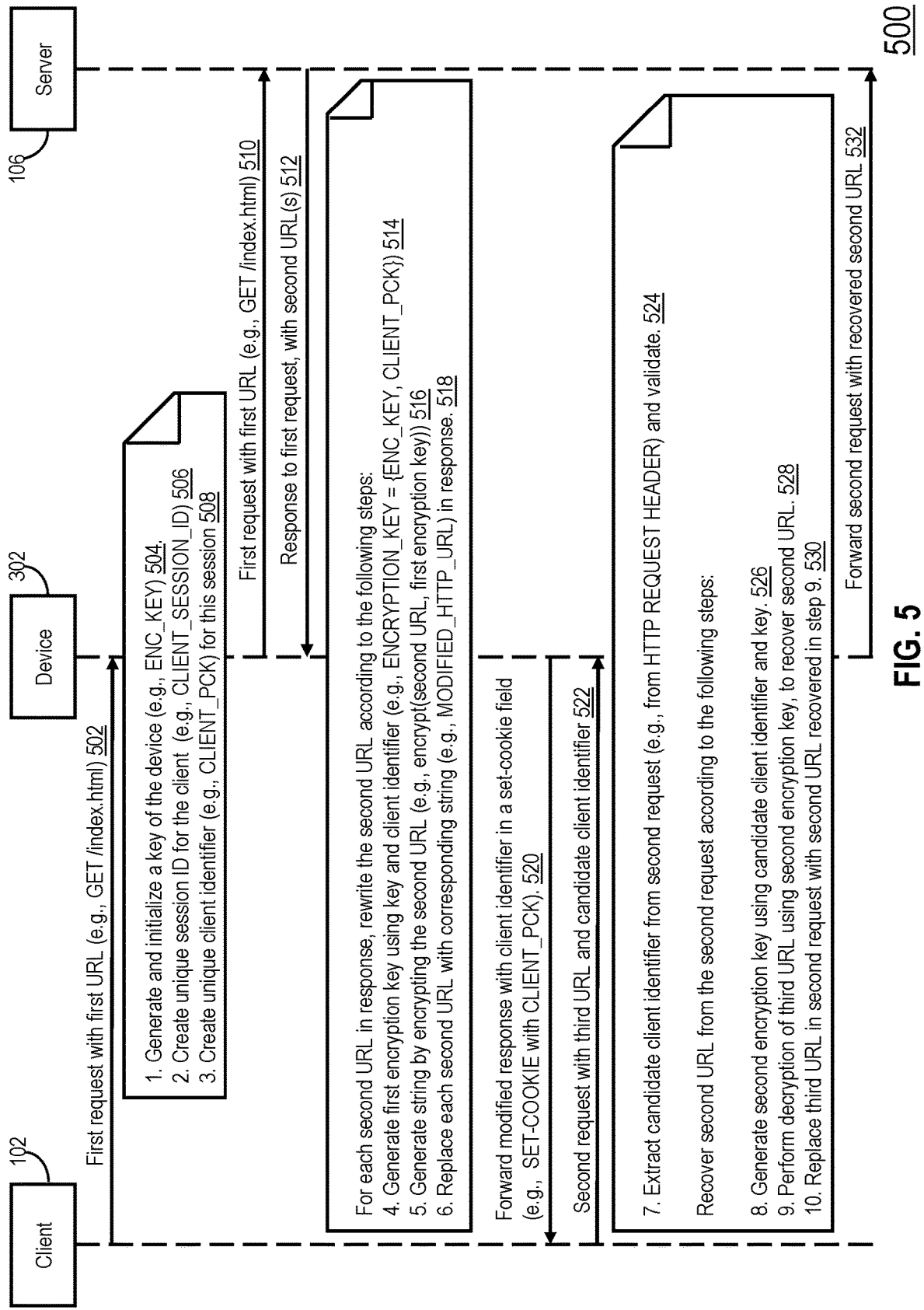
FIG. 5 is a communication diagram of a system for preventing unauthorized access to of information from a resource, in accordance with an illustrative embodiment.

Referring now to FIG. 5, depicted is a communication diagram of an embodiment of a process 500 for preventing unauthorized access, retrieval, storage, and/or usage of information from a resource. In accordance with process 500, the client 102 may send, transmit, and/or communicate a first request/message (e.g., HTTP GET, GET /index.html, and/or other requests) to the server 106 via the device 302 (502). The first request (e.g., HTTP REQUEST) may include a first URL (e.g., /index.html and/or other resources) of the server 106 and/or other information. Responsive to receiving and/or obtaining the first request from the client 102, the device 302 may create, generate, configure, and/or establish a key of the device 302 (e.g., ENC_KEY) (504), in some embodiments. The key of the device 302 can be shared, accessed, and/or used by one or more devices in a system (e.g., distributed system). In some embodiments, the device 302 may create and/or generate a unique session ID for the client 102 (e.g., CLIENT_SESSION_ID) (506) and/or a unique client identifier 306(1) (e.g., CLIENT_PCK) for the session (508). In some embodiments, the client identifier 306(1) and/or the key of the device 302 can be used (e.g., by the device 302) to generate, create, compute, and/or calculate a first encryption key to perform encryption (e.g., perform encryption of a second URL). In some embodiments, the client identifier 306(1) may be used to determine whether a received request (e.g., a second request to access a resource 304) is valid. The device 302 may store and/or maintain the client identifier 306(1) in the data/information of the session.

In some embodiments, the device 302 may forward, send, route, and/or communicate the first request (e.g., GET /index.html) to the server 106 (510). The server 106 may receive and/or obtain the first request (e.g., a request to access a first resource 304(1)) from the device 302 (510) and/or send/transmit a response (e.g., response for index.html and/or other HTTP responses) to the device 302 (512). The response from the server 106 may include, provide, and/or specify one or more second URLs and/or other information. Responsive to receiving the response from the server 106, the device 302 may parse, analyze, and/or evaluate the response (e.g., HTTP response page) from the server 106 (e.g., to identify each second URL). In some embodiments, the device 302 may generate, determine, and/or configure a first encryption key using the client identifier 306(1) and/or the key of the device 302 (514). For example, the device 302 may determine the first encryption key by appending, adding, combining, and/or incorporating the client identifier 306(1) to the key of the device 302 (e.g., ENCRYPTION_KEY={ENC_KEY, CLIENT_PCK}). For each second URL in the response, the device 302 may generate a string by performing encryption using the second URL(s) and the first encryption key (516). For instance, the device 302 can generate the string(s) by encrypting each second URL according to (or by using) the first encryption key (e.g., encrypt (second URL, first encryption key)). The string(s) can be unique and/or valid to a particular client 102

(e.g., the client 102 sending the first request) and/or session (e.g., a session between the client 102 and the server 106).

Once the device 302 generates/determines the string(s), the device 302 can update, modify, and/or adjust the received response from the server 106 (518). For example, the device 302 may update the response by replacing each second URL with a corresponding string (e.g., an encrypted version of each second URL). By replacing each second URL with the corresponding string, the device 302 may obfuscate the second URL(s) into the string(s), thereby making the original second URL(s) inaccessible or unavailable to the client 102 (or a bot) to parse/read (the second URL's information on path/folder/directory). In addition to modifying each second URL, the device 302 may further update the response by including and/or incorporating the client identifier 306(1) (and/or other information) in a set-cookie field (e.g., a set-cookie HTTP header) of the response. For instance, the device 302 may perform a set-cookie command with the client identifier 306(1). As such, subsequent requests to access a resource 304 can provide, specify, and/or indicate a candidate client identifier 306(2) (e.g., an HTTP cookie CLIENT_PCK), in the requests' cookie information.

In some embodiments, the device 302 may send, forward, transmit, route, and/or communicate the updated/modified response from the server 106 (e.g., the response including the modified second URL(s) and/or the client identifier 306(1)) to the client 102 (520). Responsive to receiving the updated response, the client 102 may send, transmit, and/or broadcast a second request (e.g., GET request and/or other requests) to the server 106 via the device 302 within the session (522). The second request may include, indicate, and/or specify a third URL (e.g., obfuscated into a corresponding string), a candidate client identifier 306(2) and/or other information. In some embodiments, the device 302 may extract the candidate client identifier 306(2) (e.g., included in a HTTP REQUEST HEADER as a cookie of the second request) to determine whether the candidate client identifier 306(2) (provided by the client 102, e.g., as a cookie) is valid (e.g., whether the candidate client identifier 306(2) matches or corresponds to the client identifier 306(1) stored/calculated by the device 302) (524). If the device 302 determines the candidate client identifier 306(2) of the second request is invalid, the device 302 may drop the second request, and therefore prevent/preclude the server 106 from receiving the second request. Otherwise (e.g., if the candidate client identifier 306(2) of the second request is valid), the device 302 may proceed with step 526 of process 500.

Responsive to receiving and/or obtaining the second request, and/or responsive to determining the candidate client identifier 306(2) is valid, the device 302 may generate, configure, and/or determine a second encryption key using the candidate client identifier 306(2) and/or the key of the device 302 (526). For instance, the device may determine the second encryption key by appending and/or combining the candidate client identifier 306(2) and/or the key of the device 302. Once the device 302 determines/generates the second encryption key, the device 302 may determine whether at least one second URL (from the server response) is recoverable/retrievable based on (or by using) the third URL (e.g., an encrypted URL) of the second request. For instance, the device 302 may perform decryption of the third URL using the second encryption key, to determine whether the at least one second URL is recoverable (528). A failure of the decryption can be indicative that the at least one second URL is unrecoverable using the third URL (e.g., the second request is invalid). In one example, a failure of the decryption can occur if the third URL is encrypted according to another key of the device 302 (e.g., a stale and/or expired key). As such, the device 302 may drop the second request responsive to a failure of the decryption (e.g., to prevent the server 106 from receiving the request). If, for example, the decryption of the third URL (e.g., using the second encryption key) is successful, the at least one second URL is recoverable according to the third URL (e.g., the second request is valid). For instance, a decrypted third URL may include or correspond to at least one second URL from the response, and as such, the at least one second URL is recoverable using the third URL. In some embodiments, the device 302 may update, change, and/or modify the second request by replacing the third URL in the second request (e.g., an obfuscated URL) with the recovered second URL (e.g., determined according to the decryption) (530). The device 302 may allow the server 106 to receive the second request by forwarding, sending, transmitting, and/or routing the second request to the server 106 (532).

Figure 6:
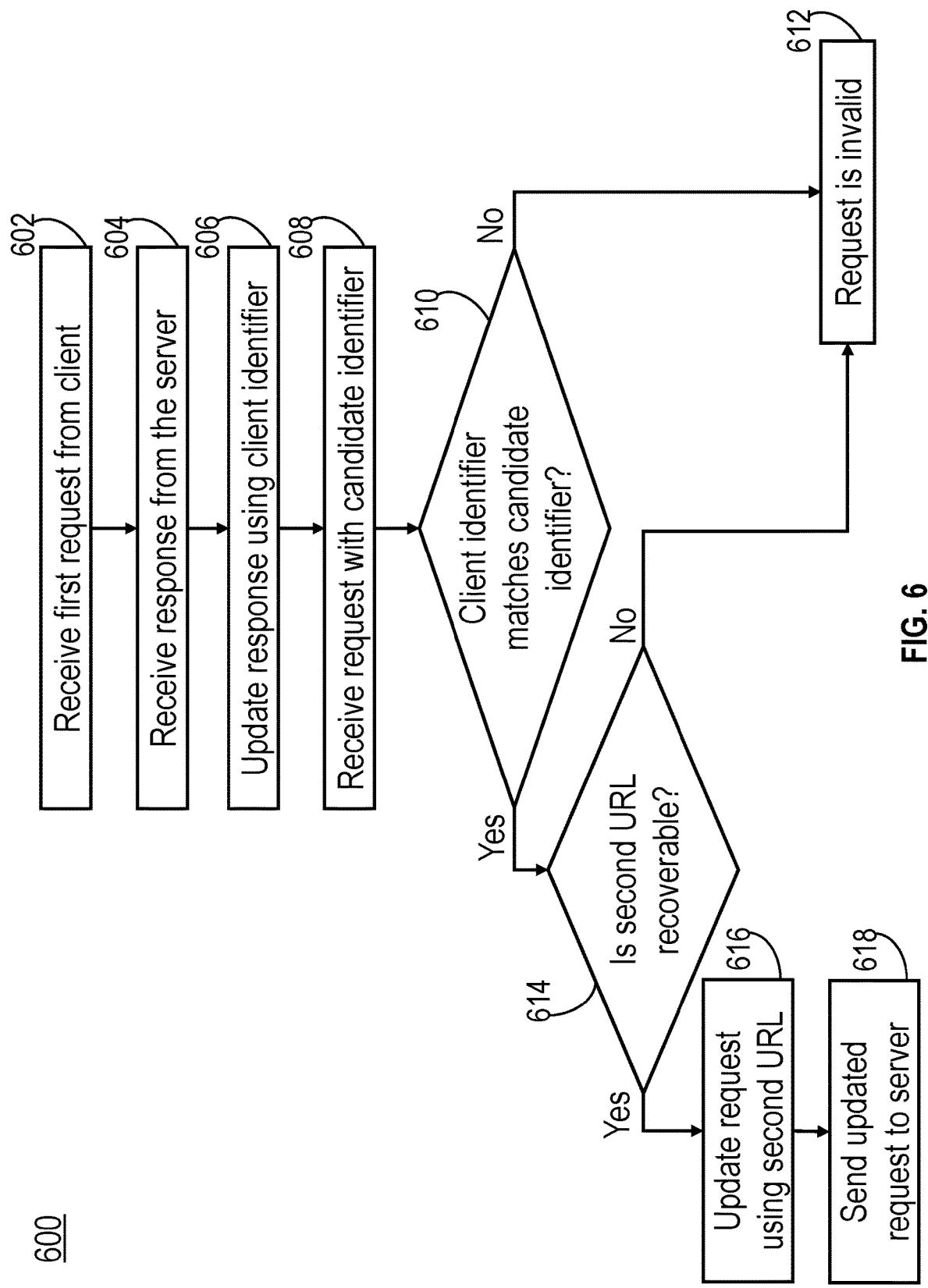
FIG. 6 is a flow diagram of an example method for preventing unauthorized access to information from a resource, in accordance with an illustrative embodiment.

Referring to FIG. 6, depicted is a flow diagram of one embodiment of a method for preventing unauthorized access, retrieval, storage, and/or usage of information from a resource. The functionalities of the method may be implemented using, or performed by, the components detailed herein in connection with FIGS. 1-5. In brief overview, a device 302 may receive a first request from the client that includes a first uniform resource locator (URL) of the server (602). The device 302 may receive a response from the server 106 (604). The device 302 may update the response using a client identifier 306(1) (606). The device 302 may receive a second request with a candidate client identifier 306(2) (608). The device 302 may determine whether the client identifier 306(1) matches the candidate client identifier 306(2) of the second request (610). The device 302 may determine the second request is invalid (612). The device 302 may determine whether a second URL is recoverable (614). The device 302 may update the second request using the recovered second URL (616). The device 302 may allow the server 106 to receive the updated second request (618).

Referring now to operation (602), and in some embodiments, a device 302 (e.g., an ADC and/or other devices) in a session may receive and/or obtain a first request (e.g., HTTP GET REQUEST) from the client 102. The first request may include, provide, and/or specify a first URL of the server 106 and/or other information. In some embodiments, the first request may include or correspond to a request to access and/or traverse a first resource 304 of the server 106. Referring now to operation (604), and in some embodiments, the device 302 may receive a response from the server 106. For instance, responsive to receiving the first request, the server 106 may determine one or more second URLs associated to the first URL of the first request. In one example, the first URL can be a parent URL to the one or more second URLs. Upon determining the one or more second URLs, the server 106 may send, transmit, and/or communicate a response to the device 302. The response may include, provide, and/or indicate the one or more second URLs and/or other information of the resources associated to the URLs.

Referring now to operation (606), and in some embodiments, the device 302 may update, adjust, and/or modify the response using the client identifier 306(1). For instance, the device 302 may update the response by including and/or incorporating a client identifier 306(1) for the session (e.g., CLIENT_SESSION_ID and/or CLIENT_PCK) in a set-cookie field (e.g., set-cookie HTTP header). In one example, responsive to receiving the response from the server 106, the device 302 may parse the response to determine and/or identify the second URL(s). For each second URL in the response, the device 302 may obfuscate, obscure, and/or randomize the second URL (e.g., using a hash function and/or encryption) into a string. In some embodiments, obfuscating each second URL into a string may comprise obfuscating and/or removing path and/or directory structure information in the second URL. As such, the obfuscated/removed path and/or directory structure information of the second URL can be inaccessible to the client 102. Responsive to determining the string(s), the device 302 may replace, exchange, change, and/or substitute each second URL in the response with a corresponding string.

In some embodiments, the device 302 may obfuscate the second URL into a string by generating, configuring, and/or determining a URL identifier (e.g., UNIQUE_URL_NUMBER). The URL identifier can be unique to each second URL in the response. In certain embodiments, the device 302 can use the URL identifier(s) to generate a corresponding string for each second URL. For example, the device 302 may apply a hash function on a combination of the URL identifier(s), the client identifier 306(1), and/or the domain name of the server 106. As such, for each second URL, the device 302 may apply the hash function (e.g., to obtain a string, such as a hash value) to a corresponding URL identifier, the client identifier 306(1), and/or the domain name of the server 106. Responsive to generating the string(s) (e.g., for obfuscating the second URL(s)), the device 302 can maintain, store, and/or track the mapping and/or association between each string and a corresponding second URL. For instance, the device 302 can maintain the mapping in mapping data for the session. In some embodiments, a particular string can indicate and/or identify a specific second URL (e.g., due to the unique URL identifier). As such, each string is unique to a corresponding second URL.

In some embodiments, the device 302 may obfuscate the second URL into a string by generating, configuring, and/or determining a first encryption key. The first encryption key can be determined according to (or by using) the client identifier 306(1) and/or a key of the device 302. For instance, the first encryption key may include or correspond to a combination of the client identifier 306(1) and/or the key of the device 302. In some embodiments, the device 302 can preconfigure, secure and/or store the key of the device 302 (e.g., in a cache of the device 302), and as such, the client 102 may be unable to access/use the key 308 (e.g., to compute a first/second encryption key). Responsive to generating the first encryption key, the device 302 may generate the string(s) by performing encryption using the second URL(s) and/or the first encryption key. For instance, the device 302 may generate an encrypted version of the second URL(s) by encrypting each second URL using the first encryption key. Once obfuscation of the second URL(s) into the second URL(s) is performed, the device 302 may replace each second URL in the response with a corresponding string (e.g., an encrypted version of the second URL).

Referring now to operation (608), and in some embodiments, the device 302 may receive/obtain a second request with a candidate client identifier 306(2). For instance, the device 302 may receive a second request (e.g., HTTP GET request) from a client 102 (e.g., the client 102 sending the first request and/or other client devices 102). The second request may include and/or provide a candidate client identifier 306(2) (e.g., as a cookie in a header of the second request for instance) and/or a third URL. Responsive to receiving the second request, the device 302 may determine whether the second request is valid by performing a primary validation/authentication (e.g., first level check) of the second request. For example, the device 302 may determine whether the candidate client identifier 306(2) from the second request (e.g., in a set-cookie field) matches (or is within a defined range/extent of) the client identifier 306(1) (610). If the candidate client identifier 306(2) fails to match the client identifier 306(1), the device 302 may determine the second request is invalid, and therefore can prevent the server 106 from receiving the second request (612). By preventing the server 106 from receiving the request (e.g., the second request), the device 302 may prevent the client(s) 102 from accessing information from one or more resources 304. As such, based on a comparison of the client identifiers 306 (e.g., client identifier 306(1) and candidate client identifier 306(2)), the device 302 may determine whether the client 102 has authorization to access the URL included in the request (e.g., a second request).

In some embodiments, the candidate client identifier 306(2) can match the client identifier 306(1). If the candidate client identifier 306(2) matches the client identifier 306(1), the device 302 may perform a secondary validation/authentication (e.g., second level check) of the second request. For instance, the device 302 may determine whether the second URL is recoverable using the third URL (614). In one example, the device 302 may determine whether the second URL is recoverable by determining whether the third URL (e.g. a hash value) is in the mapping data as a string. The third URL in the mapping data (e.g., as a string) can be associated with at least one second URL from the response. If the third URL is in the mapping data, the device 302 may recover, extract, and/or obtain the second URL from the mapping data according to the string and/or the mapping. For instance, the device 302 may determine a second URL from the mapping data that is associated/mapped to a certain string, wherein the string includes or corresponds to the third URL. In another example, the device 302 may determine whether the second URL is recoverable by generating and/or determining a second encryption key using the candidate client identifier 306(2) and/or the key of the device 302 (e.g., combining/appending the candidate client identifier 306(2) and/or the key of the device). Responsive to generating the second encryption key, the device 302 may perform decryption of the third URL using the second encryption key. If the second URL is unrecoverable by the above methods, the device 302 may determine that the second request is invalid (e.g., drop the second request) (612). For example, a failure of the decryption may be indicative that the second URL is unrecoverable using the third URL.

Referring now to operation (616), and in some embodiments, if the second URL is recoverable using the third URL, the device 302 may update, adjust, and/or modify the second request, thereby removing obfuscation in the second request. For instance, the device 302 can update the second request by replacing and/or exchanging the third URL in the second request with at least one recovered second URL. Once the device 302 updates the second request, the device 302 may allow the server 106 to receive the second request (618). In one example, the device 302 may send, transmit, forward, and/or communicate the updated (un-obfuscated) second request to the server 106. By allowing the server 106 to receive the second request, the device 302 may allow the client 102 to access/use/traverse one or more resources 304 of the server 106 (e.g., the resource(s) 304 associated with the third URL(s) of the second request).

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

I claim:

1. A method comprising:
  receiving, by a device intermediary between a client device and a server in a session, a first request from the client device that includes a first uniform resource locator (URL) of the server;
  receiving, by the device, a response from the server that includes a second URL;
  updating, by the device, the response by including a client identifier uniquely identifying the client device for the session in a set-cookie field, obfuscating the second URL into a string, and replacing the second URL in the response with the string;
  receiving, by the device, a second request that includes a candidate client identifier, and a third URL; and
  determining, by the device, whether the second request is valid by:
    matching the candidate client identifier with the client identifier;
    determining whether mapping for the session includes the third URL;
    determining whether the second URL is recoverable using the third URL;
    identifying the second URL from the mapping according to the third URL; and
  replacing, by the device, the third URL in the second request with the second URL;
  wherein obfuscating the second URL into a string comprises:
    generating, by the device, a URL identifier unique to the second URL; and
    generating, by the device, the string by applying a hash function on a combination of the URL identifier, the client identifier and a domain name of the server.

2. The method of claim 1, comprising:
  maintaining, by the device in mapping data for the session, a mapping between the string and the second URL.

3. The method of claim 2, wherein determining whether the second URL is recoverable using the third URL comprises:
  determining, by the device, whether the third URL is in the mapping data as the string; and
  recovering, by the device, the second URL from the mapping data according to the string and the mapping.

4. A device intermediary between a client device and a server, comprising:
  at least one processor configured to:
    receive, in a session, a first request from the client device that includes a first uniform resource locator (URL) of the server;
    receive a response from the server that includes a second URL;
    update the response by including a client identifier uniquely identifying the client device for the session in a set-cookie field, obfuscating the second URL into a string, and replacing the second URL in the response with the string;
    receive a second request that includes a candidate client identifier, and a third URL;
    determine whether the second request is valid-according to:
      a match between the candidate client identifier and the client identifier;
      determination that mapping for the session includes the third URL;
      determination that the second URL is recoverable using the third URL;
      identifying of the second URL from the mapping according to the third URL; and
      wherein the device replaces the third URL in the second request with the second URL;
    wherein the at least one processor is configured to obfuscate the second URL into a string, by:
      generating a URL identifier unique to the second URL; and generating the string by applying a hash function on a combination of the URL identifier, the client identifier and a domain name of the server.

5. The device of claim 1, wherein the at least one processor is configured to:

maintain, in mapping data for the session, a mapping between the string and the second URL.

6. The device of claim 5, wherein the at least one processor is configured to determine whether the second URL is recoverable using the third URL, by:

determining whether the third URL is in the mapping data as the string; and recovering the second URL from the mapping data according to the string and the mapping.

* * * * *